(12) United States Patent
Gu

(10) Patent No.: US 10,299,191 B2
(45) Date of Patent: May 21, 2019

(54) METHOD AND DEVICE FOR ESTABLISHING WIRELESS CONNECTION

(71) Applicant: SHANGHAI LIANSHANG NETWORK TECHNOLOGY CO., LTD., Shanghai (CN)

(72) Inventor: Zhengxiang Gu, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/038,199

(22) Filed: Jul. 18, 2018

(65) Prior Publication Data

US 2018/0343606 A1    Nov. 29, 2018

Related U.S. Application Data

(63) Continuation of application No. PCT/CN2016/076945, filed on Mar. 22, 2016.

(30) Foreign Application Priority Data

Jan. 18, 2016    (CN) .......................... 2016 1 0031075

(51) Int. Cl.
*H04M 1/66*    (2006.01)
*H04W 48/08*   (2009.01)
(Continued)

(52) U.S. Cl.
CPC ........... *H04W 48/08* (2013.01); *H04W 12/06* (2013.01); *H04W 48/20* (2013.01);
(Continued)

(58) Field of Classification Search
CPC ..... H04W 48/08; H04W 12/06; H04W 8/245; H04W 88/02; H04W 24/02; H04M 1/72519; H04M 1/72522
(Continued)

(56) References Cited

U.S. PATENT DOCUMENTS 8,391,882 B2    3/2013 Sampath et al.
2010/0272050 A1*   10/2010 Lim ....................... H04W 8/22
                                                            370/329
(Continued)

FOREIGN PATENT DOCUMENTS

CN    102711082 A    10/2012
CN    103731810 A     4/2014
(Continued)

*Primary Examiner* — Danh C Le
(74) *Attorney, Agent, or Firm* — Kilpatrick Townsend & Stockton, LLP

(57) ABSTRACT

The present application is to provide a method and device for sharing a wireless access point. The method includes obtaining a wireless access point sharing request submitted by a user equipment, the sharing request comprising wireless access point related information of the wireless access point, and the wireless access point related information comprising sharing mode information corresponding to the wireless access point; performing related information verification on the sharing request, and storing the wireless access point related information of the wireless access point, which is corresponding to the sharing request passing the related information verification.

10 Claims, 8 Drawing Sheets

(51) Int. Cl.
*H04W 48/20* (2009.01)
*H04W 12/06* (2009.01)
*H04W 8/24* (2009.01)
*H04M 1/725* (2006.01)

(52) U.S. Cl.
CPC .... *H04M 1/72519* (2013.01); *H04M 1/72522* (2013.01); *H04W 8/245* (2013.01)

(58) Field of Classification Search
USPC .......................... 455/411, 418, 550.1; 726/8
See application file for complete search history.

(56) References Cited

U.S. PATENT DOCUMENTS

| | | | | |
|---|---|---|---|---|
| 2011/0030067 | A1* | 2/2011 | Wilson | G06F 21/6245 726/27 |
| 2011/0039494 | A1* | 2/2011 | Shon | H04W 8/005 455/41.1 |
| 2013/0054826 | A1* | 2/2013 | Hong | H04L 12/1818 709/231 |
| 2014/0310348 | A1* | 10/2014 | Keskitalo | H04L 65/4084 709/204 |
| 2014/0337954 | A1* | 11/2014 | Ahmed | G06F 21/41 726/8 |
| 2015/0142979 | A1 | 5/2015 | Lee et al. | |
| 2016/0316243 | A1* | 10/2016 | Park | H04N 21/2343 |
| 2017/0086240 | A1* | 3/2017 | Zhang | H04W 76/10 |
| 2017/0318022 | A1* | 11/2017 | Perez | H04W 12/08 |
| 2018/0218220 | A1* | 8/2018 | Jung | H04W 4/08 |

FOREIGN PATENT DOCUMENTS

| | | |
|---|---|---|
| CN | 103997733 A | 8/2014 |
| CN | 104955048 A | 9/2015 |
| CN | 105069669 A | 11/2015 |
| CN | 105120458 A | 12/2015 |

* cited by examiner

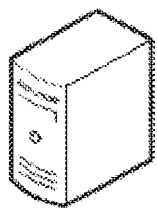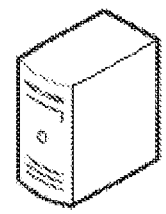

Network device 1          User equipment 2

S81 A user equipment 2 sending a sharing request for a wireless access point to a corresponding network device 1, wherein the sharing request comprises wireless access point related information of the wireless access point, the wireless access point related information comprising sharing mode information corresponding to the wireless access point S82 The network device 1 performing a related information verification on the sharing request S83 The network device 1 storing the wireless access point related information of the wireless access point corresponding to the sharing request that passes the related information verification

FIG. 8

United States Patent US 10,299,191 B2

METHOD AND DEVICE FOR ESTABLISHING WIRELESS CONNECTION

CROSS-REFERENCES TO RELATED APPLICATIONS

This application is a continuation of International Application No. PCT/CN2016/076945, filed on Mar. 22, 2016, which claims priority to Chinese Patent Application No. 201610031075.5, filed on Jan. 18, 2016. The disclosures of the aforementioned applications are hereby incorporated by reference in their entireties.

FIELD OF THE INVENTION

The present application relates to the field of computers, and in particular to a technique for sharing a wireless access point.

BACKGROUND OF THE INVENTION

In the prior art, when user equipment is to access a wireless network, for example, when the user equipment is to be connected to a WiFi (wireless fidelity) network, a corresponding connection password is usually required for an encrypted wireless access point. In practical applications, open wireless access points, such as most of the public wireless access points, usually have a lower signal strength, stability and security than that of general encrypted wireless access points; however, if a demand user does not know the connection password of the encrypted wireless access point, for example, when the demand user and the owner of the encrypted wireless access point do not know each other, there is a low probability to obtain the connection password of the encrypted wireless access point, and therefore, the wireless network corresponding to the wireless access point may not be accessed. The encrypted wireless access point connection password can only be known to and used by the owner of the wireless access point or a limited number of individuals, and these people who know the connection password may not effectively share the connection password of the wireless access point to more demand users. Today, as the computer technology develops quickly, information resource sharing is a major trend for the efficient integration and utilization of information resources; however, the existing technologies may not effectively improve the utilization rate of wireless network resources corresponding to numerous encrypted wireless access points, and at the same time, the networking usage demand of the demand users is also not effectively satisfied, such that the demand for information resource sharing may not be well solved.

BRIEF SUMMARY OF THE INVENTION

The present application is to provide a method and device for sharing a wireless access point.

According to one embodiment of the present application, a method for sharing a wireless access point at a network device end is provided. The method includes obtaining a sharing request for a wireless access point submitted by a user equipment, and the sharing request comprises wireless access point related information of the wireless access point, the wireless access point related information comprising sharing mode information corresponding to the wireless access point, performing a related information verification on the sharing request; and storing the wireless access point related information of the wireless access point corresponding to the sharing request that passes the related information verification.

According to another embodiment of the present application, a method for sharing a wireless access point at a user equipment end is further provided. The method includes sending a sharing request for a wireless access point to a corresponding network device, and the sharing request comprises wireless access point related information of the wireless access point, the wireless access point related information comprising sharing mode information corresponding to the wireless access point.

According to still another embodiment of the present application, a network device for sharing a wireless access point is further provided. The network device includes a first means for obtaining a sharing request for a wireless access point submitted by a user equipment, and the sharing request comprises wireless access point related information of the wireless access point, the wireless access point related information comprising sharing mode information corresponding to the wireless access point, a second means for performing a related information verification on the sharing request, and a third means for storing the wireless access point related information of the wireless access point corresponding to the sharing request that passes the related information verification.

According to yet another embodiment of the present application, a user equipment for sharing a wireless access point is further provided. The user equipment includes a ninth means for sending a sharing request for a wireless access point to a corresponding network device, and the sharing request comprises wireless access point related information of the wireless access point, the wireless access point related information comprising sharing mode information corresponding to the wireless access point.

According to another embodiment of the present application, a system for sharing a wireless access point is further provided, and the system comprises: a network device for sharing a wireless access point provided according to still another embodiment of the present application, and a user equipment for sharing a wireless access point provided according to yet another embodiment of the present application.

In the present application, a network device obtains a sharing request for a wireless access point submitted by a user equipment, performs a related information verification, and then stores wireless access point related information of the wireless access point that passes the verification. Here, the network device may obtain wireless access point related information from a wireless access point shared by various user equipment, so that the wireless access point that can only be originally known to and used by the wireless access point owner or a limited number of individuals have the opportunity to be obtained and used by more demand users. The utilization rate of the wireless network resources corresponding to the wireless access point is improved, and the using requirements for networking of demand users are fully satisfied to implement information resource sharing in a larger range. Here, the sharing mode information included in the sharing request may make the usage of the shared wireless access point more diversified, for example, the different sharing requirements of the user equipment that issue a sharing request may be satisfied by means of being free or payment, etc. Moreover, by means of performing a related information verification on the sharing request, the validity of wireless access related information of the stored wireless access point can be improved, or the security of information transaction during the sharing process can be ensured.

Further, a user equipment with ownership can send a sharing permission for his/her corresponding wireless access point to other user equipment without ownership, so that the other user equipment without ownership are authorized to be able to share the corresponding wireless access point based on the authorization as well.

Further, when the network device stores multiple versions of wireless access point related information of the same wireless access point, the priorities of the multiple versions of wireless access point related information can be determined. For example, the wireless access point related information provided by the user equipment with the ownership has a priority over the wireless access point related information of the same wireless access point provided by the user equipment without the ownership. For another example, with regard to the case of a user equipment with multiple ownerships, wireless access point related information corresponding to a temporally subsequent sharing request is prioritized. Here, by setting the priority of the wireless access point related information, the wireless access point related information which is most effective and has the highest connection success rate can be determined from multiple wireless access point related information of the same wireless access point shared by different user equipment, thereby optimizing the connection experience of the corresponding demand users to the wireless access point.

Further, the network device obtains update information for the wireless access point related information, and the update information comprises update information for the access information of the wireless access point, and/or update information for the charging mode information of the wireless access point, and updates the stored wireless access point related information or matching update marks based on the update information for the wireless access point. Here, multiple update manners can be flexibly selected based on the impact and demand of data update on the overall running efficiency, for example, updating specific data, such as access information, or/and charging mode information about the stored wireless access point based on the update information for the wireless access point related information; and for another example, setting an update mark first, and then performing an oriented data update based on the subsequent requirements, such as the request from the demand users, based on an indication of the update mark.

Here, in the present application, the user equipment implements the sharing of the wireless access point more efficiently in cooperation with the network device by sending the sharing request and the update information to the network device.

BRIEF DESCRIPTION OF THE DRAWINGS

By reading the following detailed description made with reference to the drawings for non-limiting embodiments, the other features of the present application will become more apparent:

FIG. 8 shows a flowchart of a method for sharing a wireless access point at a network device end and a user equipment end according to another embodiment of the present application.

Figure 1:
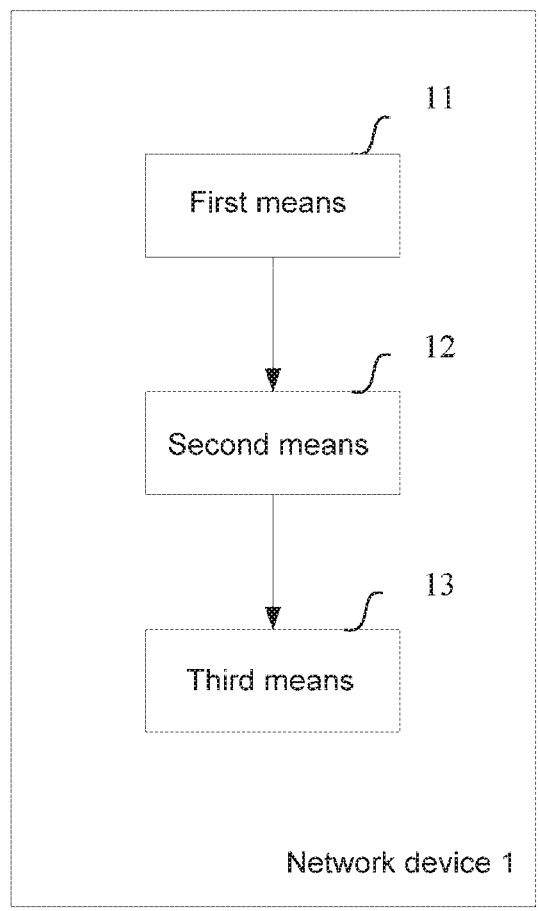
FIG. 1 shows a device schematic diagram of a network device for sharing a wireless access point according to one embodiment of the present application.

In the drawings, the same or similar reference signs represent the same or similar components.

DETAILED DESCRIPTION OF THE INVENTION

The present application is hereinafter further described in detail in conjunction with the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. A memory is an example of a computer-readable medium.

A computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

FIG. 1 shows a device schematic diagram of a network device 1 for sharing a wireless access point according to one embodiment of the present application. The network device 1 comprises first means 11, second means 12, and third means 13.

The first means 11 obtains a sharing request for a wireless access point submitted by user equipment 2, and the sharing request comprises wireless access point related information of the wireless access point, the wireless access point related information comprising sharing mode information corresponding to the wireless access point; the second means 12 performs a related information verification on the sharing request; and the third means 13 stores the wireless access point related information of the wireless access point corresponding to the sharing request that passes the related information verification.

Here, the network device 1 includes, but is not limited to, a computer, a network host, a single network server, and a cloud composed of a plurality of network server sets or a plurality of servers; here, the cloud is composed of a large number of cloud computing-based computers or network servers, and cloud computing is a type of distributed computing, and is a virtual supercomputer consisting of a group of loosely coupled computers. The user equipment 2 comprises various smart terminals, such as mobile smart devices and various personal computers. Here, it should understand that the above-mentioned network device 1 and user equipment 2 are merely exemplary, and the other existing or the network device 1 and user equipment 2 that may appear in the future should also be included in the scope of protection of the present application as applicable to the present application and are hereby incorporated by reference. Here, the wireless access point is an access point corresponding to a wireless network, and the wireless network includes, but not limited to, a wireless local area network based on IEEE 802.11 series standard protocol, for example, a wireless local area network based on IEEE 802.11b protocol, namely, a so-called WiFi network.

In one embodiment, the first means 11 obtains a sharing request for a wireless access point submitted by user equipment 2, and the sharing request comprises wireless access point related information of the wireless access point, the wireless access point related information comprising sharing mode information corresponding to the wireless access point. Here, the shared wireless access point may be a wireless access point to which the user equipment 2 itself is connected or has been successfully connected, and further, may also be any wireless access point that is stored in the user equipment 2 or that a corresponding user of the user equipment 2 has a right to share. Here, the wireless access point related information may include one or more of various types of information associated with the wireless access point, for example, the information may include access information of the wireless access point, and the access information comprises verification information for connecting a corresponding wireless access point, for example, a character string and an encrypted character string including connection password information, or description file information including the connection password information; for another example, the information may include SSID (Service Set Identifier) information of the wireless access point, MAC (Media Access Control) information of the wireless access point device, and geographical position information of the wireless access point, for example, latitude and longitude information corresponding to the wireless access point obtained based on GPS (Global Positioning System); for another example, the information may include POI (Point of Interest) information of the wireless access point, such as information of merchants around the wireless access point; for another example, the information may include signal security information, signal strength information, recommended application type information of the wireless access point, etc.; for another example, the information may include sharing mode information of the wireless access point; and for another example, in a payment mode, the information may also include charging mode information. Here, it should understand that the above-mentioned various wireless access point related information are merely exemplary, and the other existing or other types of wireless access point related information that may appear in the future should also be included in the scope of protection of the present application as applicable to the present application and are hereby incorporated by reference. Here, it may be preferable that the wireless access point related information comprises sharing mode information of the corresponding wireless access point, for example, the wireless access point is shared in a payment mode or a free mode, and the payment mode may include network transaction-based real currency payment, and may also include virtual currency payment, for example, user credits that can be used for payment. Here, users can increase the available virtual currency of their account by means of recharging or the like, or obtain consideration virtual currency issued by the system after the sharing request for the wireless access point of the user equipment 2 passes the related information verification. Here, it should understand that the above-mentioned various types of sharing mode information are merely exemplary, and the other existing or other types of sharing mode information that may appear in the future should also be included in the scope of protection of the present application as applicable to the present application and are hereby incorporated by reference. Correspondingly, it may be preferable that subsequent demand users of the wireless access point will share and use the wireless access point based on the sharing mode information corresponding to the wireless access point.

Here, the sharing request submitted by the user equipment 2 may be that a provision user corresponding to the user equipment 2 share a hotspot manually; in addition, the sharing request may also be a provision user-based pre-set selection or a default operation, and is a sharing request for the corresponding wireless access point automatically sent by the user equipment 2, for example, sharing the information of the wireless access point by default while the provision user connects the corresponding wireless access point based on the connection password information.

Here, the user equipment 2 submitting the sharing request may be user equipment corresponding to an owner of the wireless access point, that is, the owner of the wireless access point, and may also be user equipment used by other people who know the wireless access point related information but do not have the ownership.

Then, the second means 12 performs a related information verification on the sharing request. Here, the related information verification may comprise performing a validity verification on the wireless access point corresponding to the sharing request, and may further comprise verifying user identity information of the user equipment 2. Here, it may be preferable that when the sharing mode information corresponds to a free mode or a payment mode, validity verification can be performed on the shared wireless access point with the aim to ensure the success rate of connection to the corresponding wireless network based on the wireless access point related information. Further, it may be preferable that when the sharing mode is a payment mode, the user identity information of the user equipment 2 may also be verified, so that the interests of the provision user, especially the owner of the wireless access point can be better protected. Here, the verification of the user identity information may comprise the verification of whether the user equipment 2 has an ownership of the wireless access point; in addition, preferably, the verification may also comprise performing a user identity verification on user equipment 2 of other user equipment 2 without the ownership that acquire a sharing permission from the user equipment 2 with ownership, the sharing permission at this time corresponds to the payment mode, and the user equipment verification focuses on checking the other user equipment 2 without the ownership, that is, the devices authorized with the sharing permission.

Here, it should understand that the above-mentioned various types of related information verifications are merely exemplary, and the other existing or other types of related information verifications that may appear in the future should also be included in the scope of protection of the present application as applicable to the present application and are hereby incorporated by reference.

Then, the third means 13 stores the wireless access point related information of the wireless access point corresponding to the sharing request that passes the related information verification. In a scenario, the wireless access point related information will be provided by the network device 1 to a demand device for the wireless access point, so as to help a corresponding demand user increase the success networking rate, and reduce the status of the demand users without network. Therefore, in order to better read the wireless access point related information, here, it may be preferable that the network device 1 effectively stores the wireless access point shared by various user equipment 2 and performs a targeted statistical analysis based on big data, so as to improve the matching precision between the wireless access point related information and the demands of subsequent wireless access point demand users, help the demand users to reduce the networking costs, improve the success networking rate of demand users and optimize the demand user experience. In addition, it may be preferable that when the network device 1 stores multiple versions of wireless access point related information of the same wireless access point, a differentiation identifier can also be matched for each version of the wireless access point related information when stored, for example, matching the wireless access point related information with the corresponding time information, and for another example, correspondingly matching the wireless access point related information with the user equipment 2 corresponding to the sharing request, and the like.

Here, it may be preferable that when the sharing mode information indicates a payment sharing mode, the wireless access point related information, of the wireless access point corresponding to the sharing request that passes the related information verification, stored in the third means 13 comprises charging mode information of the wireless access point. The charging mode information may be flexibly selected, combined and set according to the standards such as a connection duration and the number of times of connections of the wireless access point. Here, the charging mode information may be input of corresponding information by the user equipment 2 based on a charging mode template provided by the network device 1, and may also be the customized charging mode information submitted by the users of the user equipment 2. In this way, it is possible for the users to flexibly select the desired earning mode based on their own needs.

Here, the network device 1 in the present application obtains a sharing request for a wireless access point submitted by user equipment 2, performs a related information verification, and then stores wireless access point related information of the wireless access point that passes the verification. Here, the network device 1 may obtain wireless access point related information from a wireless access point shared by various user equipment 2, so that the wireless access point that can only be originally known to and used by the wireless access point owner or a limited number of individuals have the opportunity to be obtained and used by more demand users. The utilization rate of the wireless network resources corresponding to the wireless access point is improved, and the using requirements for networking of demand users are fully satisfied to implement information resource sharing in a larger range. Here, the sharing mode information included in the sharing request may make the usage of the shared wireless access point more diversified, for example, the different sharing requirements of user equipment 2 that issue a sharing request may be satisfied by means of being free or payment, etc. Moreover, by means of performing a related information verification on the sharing request, the validity of wireless access related information of the stored wireless access point can be improved, or the security of information transaction during the sharing process can be ensured.

Figure 2:
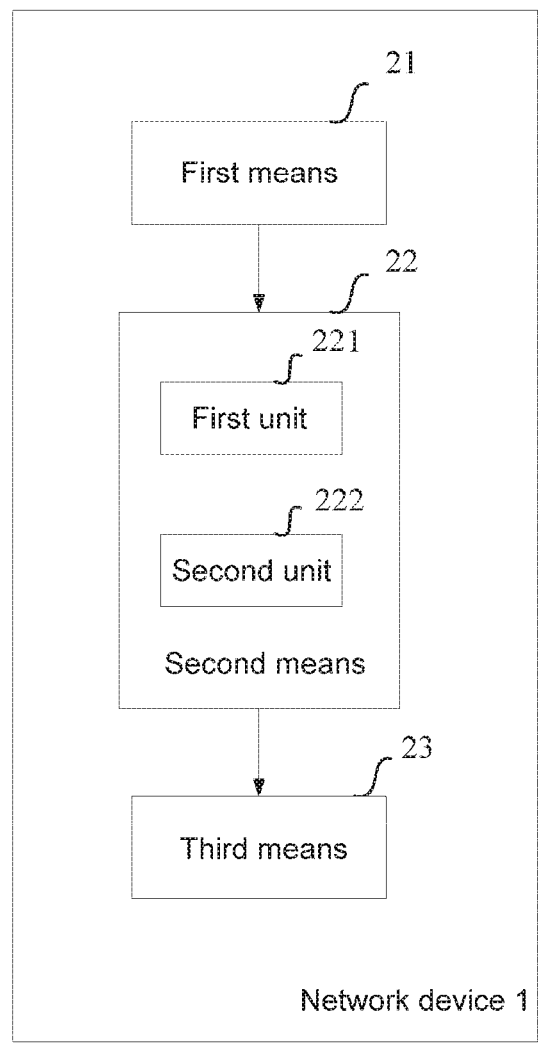
FIG. 2 shows a device schematic diagram of a network device for sharing a wireless access point according to one embodiment of the present application.

FIG. 2 shows a device schematic diagram of a network device 1 for sharing a wireless access point according to one embodiment of the present application. The network device 1 comprises first means 21, second means 22, and third means 23, the second means 22 further comprising a first unit 221 and a second unit 222.

In one embodiment, the first means 21 obtains a sharing request for a wireless access point submitted by user equipment 2, and the sharing request comprises wireless access point related information of the wireless access point, the wireless access point related information comprising sharing mode information corresponding to the wireless access point; and the second means 12 performs a related information verification on the sharing request. Here, if the sharing mode information corresponds to the free mode or the payment mode, the validity verification can be performed by the first unit 221 on the wireless access point corresponding to the sharing request, with aim to ensure the success rate of connecting to the corresponding wireless network based on the wireless access point related information. Here, by taking the validity verification of the access information of the wireless access point as an example, it may be preferable that the validity verification may be that after the user equipment 2 shares the access information of the wireless access point, if the wireless access point can be currently scanned by the user equipment 2, the first unit 221 attempts to help the user equipment 2 to connect to the wireless access point once, and if it is successful, it is presumed that the access information is valid data; the validity verification may also be that after the user equipment 2 shares the access information of the wireless access point, if the wireless access point may not be currently scanned by the user equipment 2, a validity is performed on the access information and other wireless access point related information by means of a large data analysis method in the network device 1. Then, the third means 23 stores the wireless access point related information of the wireless access point corresponding to the sharing request that passes the related information verification. Here, the contents of the first means 21 and the second means 23 are the same as or substantially the same as those of the first means 11 and the second means 13 shown in FIG. 1, which will not be described in detail herein and are hereby incorporated by reference.

Here, it should understand that the above-mentioned various types of validity verifications are merely exemplary, and the other existing or other types of validity verifications that may appear in the future should also be included in the scope of protection of the present application as applicable to the present application and are hereby incorporated by reference.

Further, it may be preferable that if the sharing mode is a payment mode, the validity verification may not only be performed by the first unit 221 on the wireless access point corresponding to the sharing request, but also the user identity information of the user equipment 2 can be verified, so that the interests of the provision user, especially the owner of the wireless access point can be better protected. That is, when the sharing mode information indicates a payment sharing mode, the second unit 222 verifies the user identity information of the user equipment 2. Here, by taking the verification of the user identity of the user equipment as an ownership identity as an example, the user identity information provided by the user equipment and capable of proving itself as the owner of the wireless access point may include nameplate information of a router corresponding to the wireless access point, and may also include web page screenshot information of the router corresponding to the wireless access, etc. Then, when a verification result for the user identity information is that the user equipment 2 has an ownership corresponding to the wireless access point, the third means 13 stores and marks wireless access point related information of the wireless access point, and the wireless access point related information correspondingly matches the user equipment 2. Here, after the user identity information verification is passed, the wireless access point related information is stored, and is marked as a wireless access point shared by the user equipment 2 with the ownership. Here, it may be preferable to correspondingly match the stored wireless access point related information with the user equipment 2. For example, the stored wireless access point related information is marked with identification information of the user equipment 2, such as device MAC information. Therefore, when the network device 1 stores multiple versions of wireless access point related information of the same wireless access point, it may also be convenient to distinguish and manage different versions of wireless access point related information of the same wireless access point based on the identification information.

Here, it should understand that the above-mentioned various types of verifications of the user identity information are merely exemplary, and the other existing or other types of verifications of the user identity information that may appear in the future should also be included in the scope of protection of the present application as applicable to the present application and are hereby incorporated by reference.

In this embodiment, the validity verification performed by means of the wireless access point can effectively ensure the success rate of connecting to the corresponding wireless network based on the wireless access point related information. By verifying the user identity information of the user equipment 2, the interests of the provision user, especially the owner of the wireless access point can be better protected.

In one embodiment, the network device 1 further comprises fourth means (not shown) and fifth means (not shown). The fourth means obtains a sharing permission for the wireless access point sent by the user equipment 2 with the ownership, and the fifth means sends the sharing permission to the other matching user equipment without ownership, and the other user equipment without ownership send sharing requests for the wireless access point to corresponding network devices 1 based on the sharing permission.

In one embodiment, it may be preferable herein to reasonably presume that a user corresponding to the user equipment 2 with ownership is an owner of the wireless access point or the one who has the right to share. Here, the user equipment 2 with ownership can set the sharing permission for its corresponding wireless access point, and the sharing permission can include allowing the other user equipment without ownership to share the wireless access point in a free mode, or allowing the other user equipment without ownership to share the wireless access point in a payment mode. Here, the sharing permission can specify other user equipment without ownership, of which a certain or several user equipment can obtain the sharing permission, and can also be a kind of conditions for setting user equipment without ownership that can obtain the sharing permission, and it is only the other user equipment without ownership satisfying the conditions that can obtain the sharing permission. For example, the user equipment 2 with ownership can share the sharing permission to some or all of contacts in its device address book. Then, the fifth means sends, actively or based on a corresponding request, the sharing permission to the other matching user equipment without ownership. Here, the other user equipment without ownership may send corresponding sharing requests for the wireless access point to the network devices 1 based on the sharing permission.

In one embodiment, the network device 1 further comprises sixth means (not shown). When the wireless access point stored in the network device 1 corresponds to multiple versions of wireless access point related information, for example, the network device 1 receives multiple sharing requests for the same wireless access point, the sixth means determines, from the multiple versions of access point related information, valid access point related information corresponding to the wireless access point, for example, determining, according to priority determination rules, that wireless access point related information with the highest priority is valid access point related information corresponding to the wireless access point. Here, the priority determination rules include, but are not limited to: the wireless access point related information provided by the user equipment 2 with ownership having a priority over the wireless access point related information of the same wireless access point provided by the user equipment 2 without ownership. Here, the user equipment 2 without ownership may be any user equipment 2 that does not have an ownership but knows the wireless access point related information at the same time; in addition, it may be preferable that if a sharing permission is set to the user equipment 2 with ownership corresponding to the wireless access point, the user equipment 2 without ownership may also send the sharing request based on the sharing permission. Here, the priority determination rules further comprise: with regard to the case of multiple user equipment 2 with ownership, wireless access point related information corresponding to a temporally subsequent sharing request is prioritized. At this time, it may be preferable that the rule may also be further divided: if access information of a wireless access point corresponding to the temporally subsequent sharing request is different from access information of the same wireless access point corresponding to the previous sharing request, wireless access point related information corresponding to the temporally subsequent sharing request is prioritized; and if the access information of the wireless access point corresponding to the temporally subsequent sharing request is consistent with the access information of the same wireless access point corresponding to the previous sharing request, the user equipment 2 corresponding to the default previous sharing request is prioritized, with the access information remaining unchanged.

Here, a scenario where the priority determination rule is applicable is that when the demand device desires to obtain wireless access point related information of a target wireless access point stored in the network device 1, the demand device can be matched with wireless access point related information with a higher priority version based on the priority determination rule, in order to increase the success rate of the demand device connecting to the wireless access point, because in general, the owner of the wireless access point has the right to change the wireless access point related information, and at the same time, the temporally subsequent information is generally the latest valid information.

In addition, the priority determination rules can further comprise: when the multiple versions of access point related information of the same wireless access point are from user equipment 2 with different operating systems, the access point related information provided by the user equipment 2 with a high operating system priority may be pre-set as the valid access point related information corresponding to the wireless access point. Here, it should understand that the above-mentioned various priority determination rules are merely exemplary, and the other existing or other priority determination rules that may appear in the future should also be included in the scope of protection of the present application as applicable to the present application and are hereby incorporated by reference.

In this embodiment, when the network device 1 stores multiple versions of wireless access point related information of the same wireless access point, the priorities of the multiple versions of wireless access point related information can be determined. For example, the wireless access point related information provided by the user equipment 2 with the ownership has a priority over the wireless access point related information of the same wireless access point provided by the user equipment 2 without ownership. For another example, with regard to the case of multiple user equipment 2 with ownership, wireless access point related information corresponding to the temporally subsequent sharing request is prioritized. Here, by means of the setting of the priority of the wireless access point related information, the wireless access point related information which is most effective and has the highest connection success rate can be determined from multiple wireless access point related information of the same wireless access point shared by the different user equipment 2, thereby optimizing the connection experience of the corresponding demand users to the wireless access point.

Figure 3:
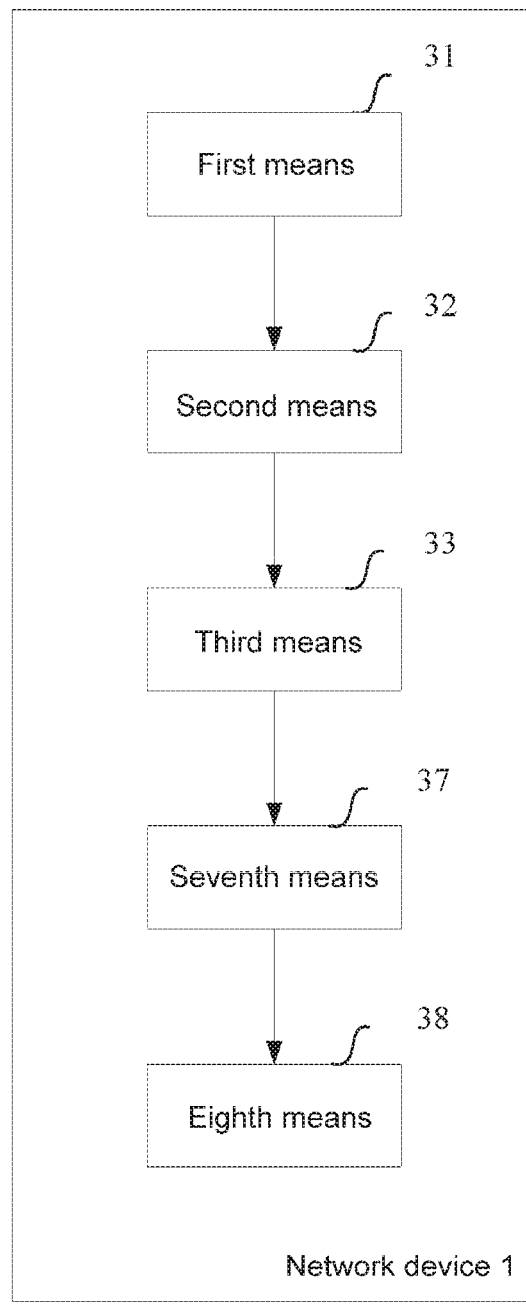
FIG. 3 shows a device schematic diagram of a network device for sharing a wireless access point according to another embodiment of the present application.

FIG. 3 shows a device schematic diagram of a network device 1 for sharing a wireless access point according to another embodiment of the present application. The network device 1 comprises first means 31, second means 32, third means 33, seventh means 37 and eighth means 38.

The first means 31 obtains a sharing request for a wireless access point submitted by user equipment 2, and the sharing request comprises wireless access point related information of the wireless access point, the wireless access point related information comprising sharing mode information corresponding to the wireless access point; the second means 32 performs a related information verification on the sharing request; and the third means 33 stores the wireless access point related information of the wireless access point corresponding to the sharing request that passes the related information verification; the seventh means 37 obtains update information for the wireless access point related information stored in the network device 1, and the update information comprises update information for access information of the wireless access point, and/or update information for the charging mode information of the wireless access point, and the update information matches the user equipment 2; and the eighth means 38 updates the stored wireless access point related information or matches update marks based on the update information. Here, the contents of the first means 31, the second means 32 and the third means 33 are correspondingly the same as or substantially the same as those of the first means 11, the second means 12 and the third means 13 shown in FIG. 1, which will not be described in detail herein and are hereby incorporated by reference.

In one embodiment, the seventh means 37 obtains update information for the wireless access point related information stored in the network device 1, and the update information comprises update information for the access information of the wireless access point, and/or update information for the charging mode information of the wireless access point, and the update information matches the user equipment 2. Here, the update information may comprise the updated specific data of the access point related information, or may also be merely change prompt information indicating that the wireless access point related information is updated. Here, it may be preferable that the update information may be obtained by the seventh means 37 from the user equipment 2. In addition, it can also be that the update information is firstly provided by the user equipment 2 to be stored to a third-party temporary database, a data cache means, etc., and then is obtained by the seventh means 37 from the temporary database and data cache means. Here, the following several application scenarios can be included In one embodiment: it can be that the seventh means 37 periodically obtains the update information, and the update information comprises the updated specific data of the access point related information, so that the eighth means 38 performs a data update on the stored wireless access point related information based on the update information; it can also be that the seventh device 37 obtains the update information in real time, and the update information comprises the updated specific data of the access point related information, so that the eighth means 38 performs a data update on the stored wireless access point related information based on the update information; it can also be that the seventh means 37 obtains the update information in real time, and the update information corresponds to the change prompt information indicating that the wireless access point related information is updated, so that the eighth means 38 only matches the stored wireless access point related information with update marks based on the update information, and in this scenario, when the subsequent demand users request the wireless access point related information, the actually updated specific data is found in the user equipment 2 or the temporary database and the data cache means again based on the heading of the update marks, such that the resource consumption of data transmission and data storage in the network device 1 can be reduced as a whole while ensuring the validity of the wireless access point related information obtained by the demand users. Here, it should understand that the above-mentioned various application scenarios of this embodiment are merely exemplary, and the other existing or other various application scenarios that may appear in the future should also be included in the scope of protection of the present application as applicable to the present application and are hereby incorporated by reference.

Here, the wireless access point related information comprises one or both of the access information and the charging mode information. And preferably, the update information matches the user equipment, such as matching the user equipment identification information. Here, it should understand that the above-mentioned access information and charging mode information are merely exemplary, and the other existing or other various types of wireless access point related information that may appear in the future should also be included in the scope of protection of the present application as applicable to the present application and are hereby incorporated by reference.

In this embodiment, the network device 1 obtains update information for the wireless access point related information, and the update information comprises update information for the access information of the wireless access point, and/or update information for the charging mode information of the wireless access point, and updates the stored wireless access point related information or matches update marks based on the update information for the wireless access point. Here, multiple update manners can be flexibly selected based on the impact and demand of data update on the overall running efficiency, for example, updating specific data, such as access information, or/and charging mode information of the stored wireless access point based on the update information for the wireless access point related information; and for another example, setting an update mark first, and then performing an oriented data update based on the subsequent requirements, such as the request from the demand users, based on an indication of the update mark.

Figure 4:
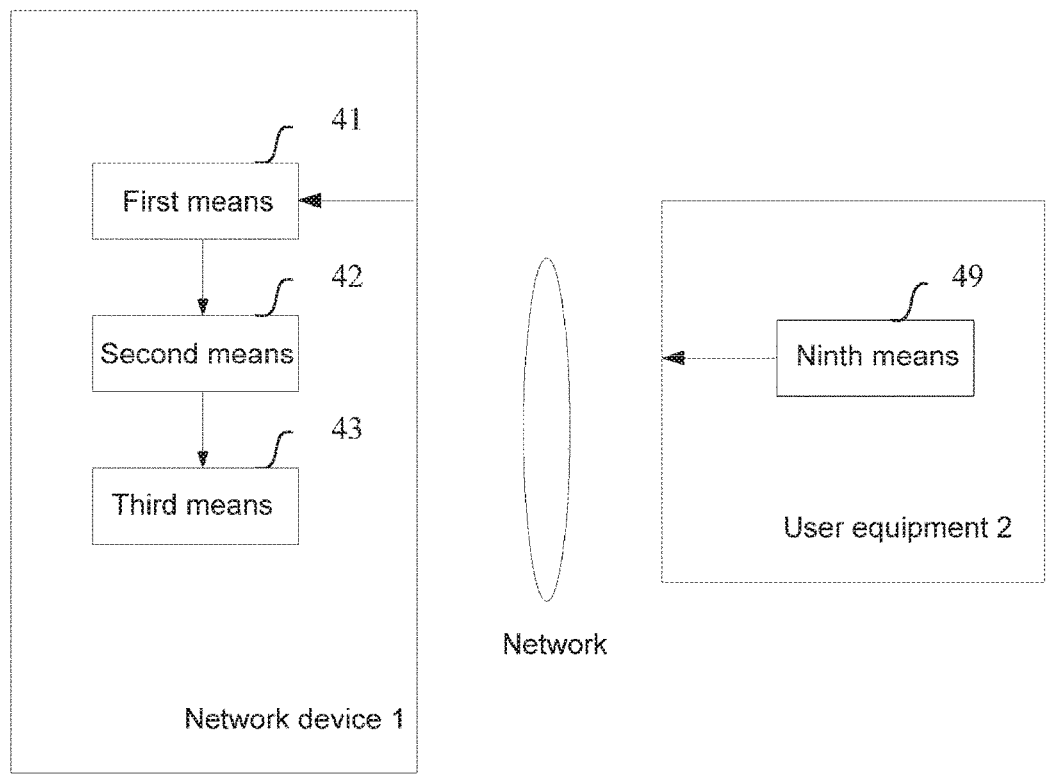
FIG. 4 shows a schematic diagram of a system of a network device and a user equipment for sharing a wireless access point according to still another embodiment of the present application.

FIG. 4 shows a schematic diagram of a system of a network device 1 and user equipment 2 for sharing a wireless access point according to still another embodiment of the present application. The network device 1 comprises first means 41, second means 42 and third means 43, and the user device 2 comprises ninth means 49.

In one embodiment, the ninth means 49 of the user equipment 2 sends a sharing request for a wireless access point to a corresponding network device 1, and the sharing request comprises wireless access point related information of the wireless access point, the wireless access point related information comprising sharing mode information corresponding to the wireless access point. And the first means 41 of the network device 1 obtains the sharing request, and then the second means 42 of the network device 1 performs a related information verification on the sharing request; and the third means 43 stores the wireless access point related information of the wireless access point corresponding to the sharing request that passes the related information verification. Here, the ninth means 49 corresponds to the first means 41, and the contents of the first means 41, the second means 42 and the third means 43 are the same as or substantially the same as those of the first means 11, the second means 12 and the third means 13 shown in FIG. 1, which will not be described in detail herein and are hereby incorporated by reference.

In this embodiment, the user equipment 2 implements the sharing of the wireless access point more efficiently in cooperation with the network device 1 by sending the sharing request and the update information to the network device 1.

Preferably, when the sharing mode information indicates a payment sharing mode, the wireless access point related information further comprises user identity information of the user equipment 2 and charging mode information of the wireless access point.

In one embodiment, the user identity information included in the sharing request submitted by the user equipment 2 herein is to facilitate the user identity verification performed by the network device 1 on the user equipment 2, and particularly when the sharing mode is the payment mode, the user identity verification can better protect the interest of the provision user, especially the owner of the wireless access point. Here, when the user equipment 2 is the owner of the wireless access point, the user identity information may include related information that can prove or presume that the user of the user equipment 2 is the owner of the wireless access point; in addition, if the user equipment 2 is a device without ownership, the user identity information may include related information matching the sharing permission provided by the user equipment with ownership.

Preferably, the user equipment 2 further comprises tenth means (not shown), and the tenth means sends update information for the wireless access point related information to a corresponding network device 1, and the update information comprises update information for access information of the wireless access point, and/or update information for the charging mode information of the wireless access point, and the update information matches the user equipment 2.

In one embodiment, update information for the wireless access point related information herein is directly sent to the network device 1 by the user equipment 2, and the update information herein may include the updated specific data of the access point related information, or may also be merely change prompt information indicating that the wireless access point related information is updated. Here, according to actual needs, different update modes for update information can be set, such as real-time update and regular update. Further, it may be preferable that it is also possible to flexibly set different update modes of the update information for different types of wireless access point related information.

Figure 5:
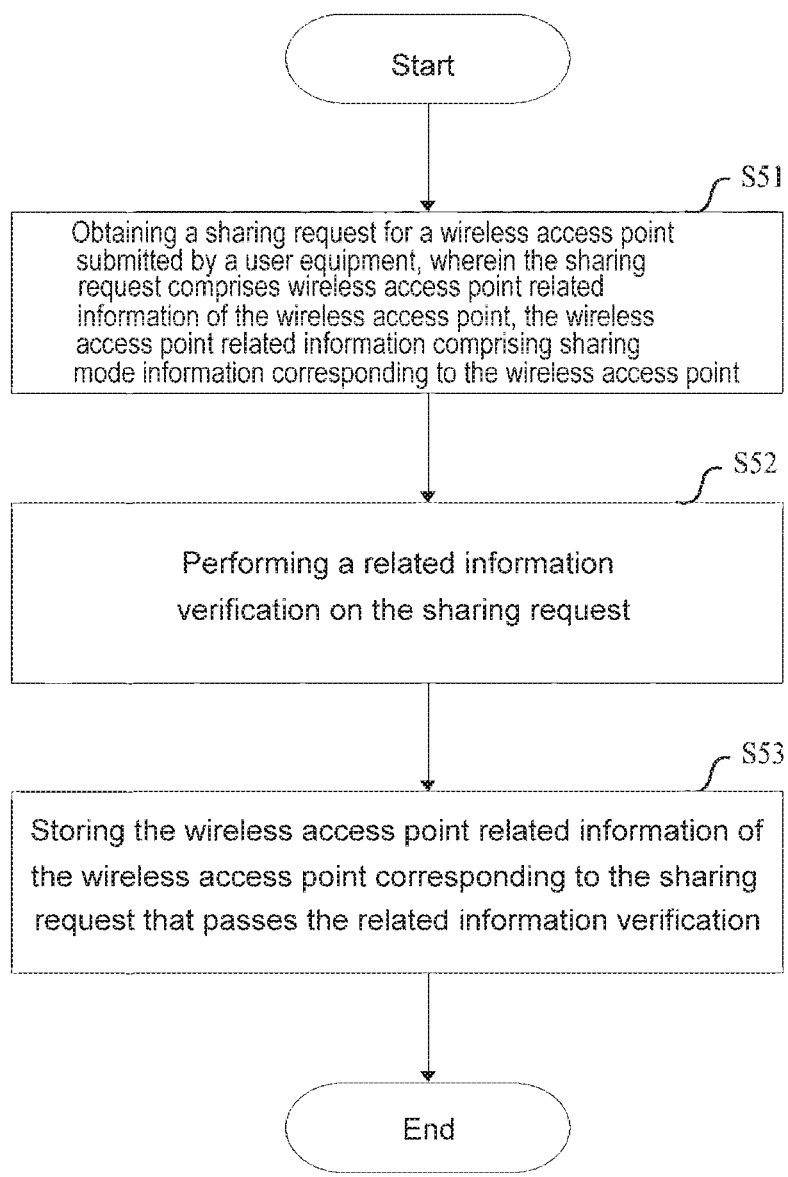
FIG. 5 shows a flowchart of a method for sharing a wireless access point at a network device end according to another embodiment of the present application.

FIG. 5 shows a flowchart of a method for sharing a wireless access point at a network device end according to another embodiment of the present application. The method comprises steps S51, S52 and S53.

In step S51, the network device 1 obtains a sharing request for a wireless access point submitted by user equipment 2, and the sharing request comprises wireless access point related information of the wireless access point, the wireless access point related information comprising sharing mode information corresponding to the wireless access point; in step S52, the network device 1 performs a related information verification on the sharing request; and in step S53, the network device 1 stores the wireless access point related information of the wireless access point corresponding to the sharing request that passes the related information verification.

Here, the network device 1 includes, but is not limited to, a computer, a network host, a single network server, and a cloud composed of a plurality of network server sets or a plurality of servers; here, the cloud is composed of a large number of cloud computing-based computers or network servers, and cloud computing is a type of distributed computing, and is a virtual supercomputer consisting of a group of loosely coupled computers. The user equipment 2 comprises various smart terminals, such as mobile smart devices and various personal computers. Here, it should understand that the above-mentioned network device 1 and user equipment 2 are merely exemplary, and the other existing or the network device 1 and user equipment 2 that may appear in the future should also be included in the scope of protection of the present application as applicable to the present application and are hereby incorporated by reference. Here, the wireless access point is an access point corresponding to a wireless network, and the wireless network includes, but not limited to, a wireless local area network based on IEEE 802.11 series standard protocol, for example, a wireless local area network based on IEEE 802.11b protocol, namely, a so-called WiFi network.

In one embodiment, in step S51, the network device 1 obtains a sharing request for a wireless access point submitted by user equipment 2, and the sharing request comprises wireless access point related information of the wireless access point, the wireless access point related information comprising sharing mode information corresponding to the wireless access point. Here, the shared wireless access point may be a wireless access point to which the user equipment 2 itself is connected or has been successfully connected, and further, may also be any wireless access point that is stored in the user equipment 2 or that a corresponding user of the user equipment 2 has a right to share. Here, the wireless access point related information may include one or more of various types of information associated with the wireless access point, for example, the information may include access information of the wireless access point, and the access information comprises verification information for connecting a corresponding wireless access point, for example, a character string and an encrypted character string including connection password information, or description file information including the connection password information; for another example, the information may include SSID (Service Set Identifier) information of the wireless access point, MAC (Media Access Control) information of the wireless access point device, and geographical position information of the wireless access point, for example, latitude and longitude information corresponding to the wireless access point obtained based on GPS (Global Positioning System); for another example, the information may include POI (Point of Interest) information of the wireless access point, such as information of merchants around the wireless access point; for another example, the information may include signal security information, signal strength information, recommended application type information of the wireless access point, etc.; for another example, the information may include sharing mode information of the wireless access point; and for another example, the information may also include charging mode information. Here, it should understand that the above-mentioned various wireless access point related information are merely exemplary, and the other existing or other types of wireless access point related information that may appear in the future should also be included in the scope of protection of the present application as applicable to the present application and are hereby incorporated by reference. Here, it is particularly preferable that the wireless access point related information comprises sharing mode information of the corresponding wireless access point, for example, the wireless access point is shared in a payment mode or a free mode, and the payment mode may include network transaction-based real currency payment, and may also include virtual currency payment, for example, user credits that can be used for payment. Here, users can increase the available virtual currency of their account by means of recharging or the like, or obtain consideration virtual currency issued by the system after the sharing request for the wireless access point of the user equipment 2 passes the related information verification. Here, it should understand that the above-mentioned various types of sharing mode information are merely exemplary, and the other existing or other types of sharing mode information that may appear in the future should also be included in the scope of protection of the present application as applicable to the present application and are hereby incorporated by reference. Correspondingly, it may be preferable that subsequent demand users of the wireless access point will share and use the wireless access point based on the sharing mode information corresponding to the wireless access point.

Here, the sharing request submitted by the user equipment 2 may be that a provision user corresponding to the user equipment 2 share a hotspot manually; in addition, the sharing request may also be a provision user-based pre-set selection or a default operation, and is a sharing request for the corresponding wireless access point automatically sent by the user equipment 2, for example, sharing the information of the wireless access point by default while the provision user connects the corresponding wireless access point based on the connection password information.

Here, the user equipment 2 submitting the sharing request may be user equipment corresponding to an owner of the wireless access point, that is, the owner of the wireless access point, and may also be user equipment used by other people who know the wireless access point related information but do not have the ownership.

Then, in step S52, the network device 1 performs a related information verification on the sharing request. Here, the related information verification may comprise performing a validity verification on the wireless access point corresponding to the sharing request, and may further comprise verifying user identity information of the user equipment 2. Here, it may be preferable that when the sharing mode information corresponds to a free mode or a payment mode, validity verification can be performed on the shared wireless access point with the aim to ensure the success rate of connection to the corresponding wireless network based on the wireless access point related information. Further, it may be preferable that when the sharing mode is a payment mode, the user identity information of the user equipment 2 may also be verified, so that the interests of the provision user, especially the owner of the wireless access point can be better protected. Here, the verification of the user identity information may comprise the verification of whether the user equipment 2 has an ownership of the wireless access point; in addition, preferably, the verification may also comprise performing a user identity verification on user equipment 2 of other user equipment 2 without the ownership that acquire a sharing permission from the user equipment 2 with ownership, the sharing permission at this time corresponds to the payment mode, and the user equipment verification focuses on checking the other user equipment 2 without the ownership, that is, the devices authorized with the sharing permission.

Here, it should understand that the above-mentioned various types of related information verifications are merely exemplary, and the other existing or other types of related information verifications that may appear in the future should also be included in the scope of protection of the present application as applicable to the present application and are hereby incorporated by reference.

Then, in step S53, the network device 1 stores the wireless access point related information of the wireless access point corresponding to the sharing request that passes the related information verification. In a scenario, the wireless access point related information will be provided by the network device 1 to a demand device for the wireless access point, so as to help a corresponding demand user increase the success networking rate, and reduce the status of the demand users without network. Therefore, in order to better read the wireless access point related information, here, it may be preferable that the network device 1 effectively stores the wireless access point shared by various user equipment 2 and performs a targeted statistical analysis based on big data, so as to improve the matching precision between the wireless access point related information and the demands of subsequent wireless access point demand users, help the demand users to reduce the networking costs, improve the success networking rate of demand users and optimize the demand user experience. In addition, it may be preferable that when the network device 1 stores multiple versions of wireless access point related information of the same wireless access point, a differentiation identifier can also be matched for each version of the wireless access point related information when stored, for example, matching the wireless access point related information with the corresponding time information, and for another example, correspondingly matching the wireless access point related information with the user equipment 2 corresponding to the sharing request, and the like.

Here, it may be preferable that when the sharing mode information indicates a payment sharing mode, in step S53, the wireless access point related information, of the wireless access point corresponding to the sharing request that passes the related information verification, stored in the network device 1 comprises the charging mode information of the wireless access point. The charging mode information may be flexibly selected, combined and set according to the standards such as a connection duration and the number of times of connections of the wireless access point. Here, the charging mode information may be input of corresponding information by the user equipment 2 based on a charging mode template provided by the network device 1, and may also be the customized charging mode information submitted by the users of the user equipment 2. In this way, it is possible for the users to flexibly select the desired earning mode based on their own needs.

Here, the network device 1 in the present application obtains a sharing request for a wireless access point submitted by user equipment 2, performs a related information verification, and then stores wireless access point related information of the wireless access point that passes the verification. Here, the network device 1 may obtain wireless access point related information from a wireless access point shared by various user equipment 2, so that the wireless access point that can only be originally known to and used by the wireless access point owner or a limited number of individuals have the opportunity to be obtained and used by more demand users. The utilization rate of the wireless network resources corresponding to the wireless access point is improved, and the using requirements for networking of demand users are fully satisfied to implement information resource sharing in a larger range. Here, the sharing mode information included in the sharing request may make the usage of the shared wireless access point more diversified, for example, the different sharing requirements of user equipment 2 that issue a sharing request may be satisfied by means of being free or payment, etc. Moreover, by means of performing a related information verification on the sharing request, the validity of wireless access related information of the stored wireless access point can be improved, or the security of information transaction during the sharing process can be ensured.

Figure 6:
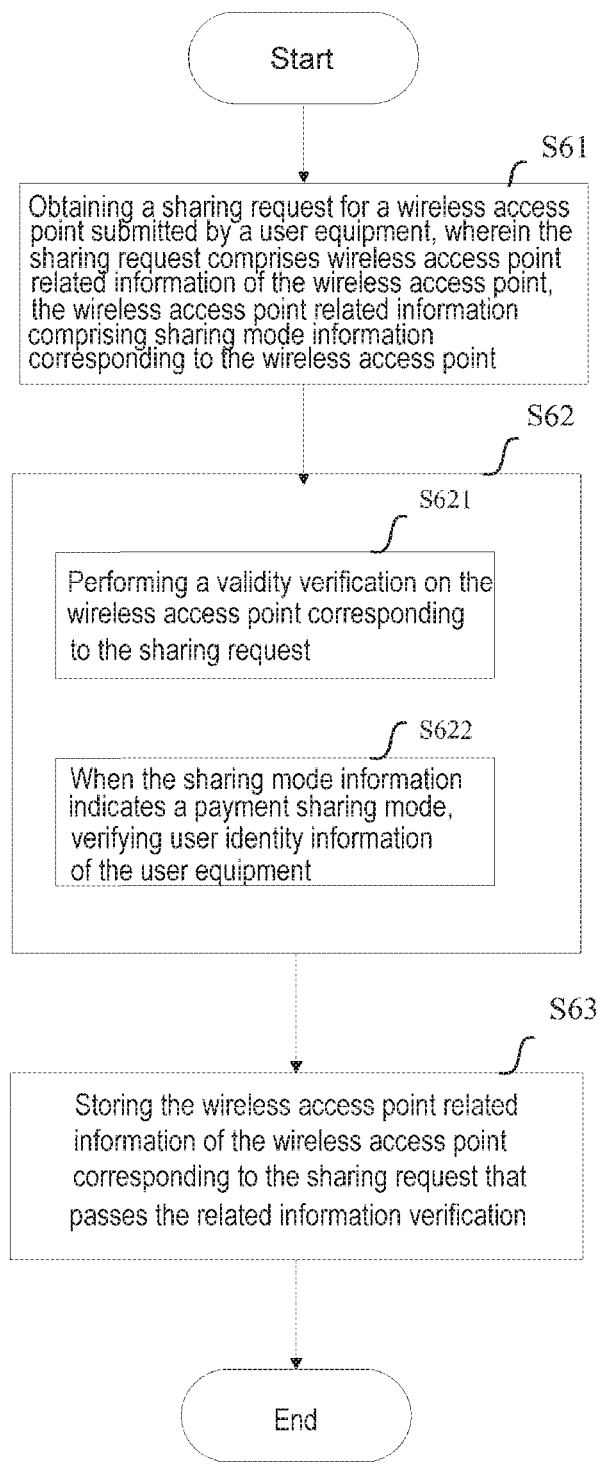
FIG. 6 shows a flowchart of a method for sharing a wireless access point at a network device end according to one embodiment of the present application.

FIG. 6 shows a flowchart of a method for sharing a wireless access point at a network device end according to one embodiment of the present application. The method comprises steps S61, S62 and S63, and step S62 comprises steps S621 and S622.

In one embodiment, in step S61, the network device 1 obtains a sharing request for a wireless access point submitted by user equipment 2, and the sharing request comprises wireless access point related information of the wireless access point, the wireless access point related information comprising sharing mode information corresponding to the wireless access point; and in step S62, the network device performs a related information verification on the sharing request. Here, if the sharing mode information corresponds to the free mode or the payment mode, the network device 1 can perform a validity verification on the wireless access point corresponding to the sharing request in step S621, with aim to ensure the success rate of connecting to the corresponding wireless network based on the wireless access point related information. Here, by taking the validity verification of the access information of the wireless access point as an example, it may be preferable that the validity verification may be that after the user equipment 2 shares the access information of the wireless access point, if the wireless access point can be currently scanned by the user equipment 2, the network device 1 attempts to help the user equipment 2 to connect to the wireless access point once, and if it is successful, it is presumed that the access information is valid data; the validity verification may also be that after the user equipment 2 shares the access information of the wireless access point, if the wireless access point may not be currently scanned by the user equipment 2, a validity is performed on the access information and other wireless access point related information by means of a large data analysis method in the network device 1. Then, in step S63, the network device stores the wireless access point related information of the wireless access point corresponding to the sharing request that passes the related information verification. Here, the contents of steps 61 and 63 are the same as or substantially the same as those of steps 51 and 53 shown in FIG. 5, which will not be described in detail herein and are hereby incorporated by reference.

Here, it should understand that the above-mentioned various types of validity verifications are merely exemplary, and the other existing or other types of validity verifications that may appear in the future should also be included in the scope of protection of the present application as applicable to the present application and are hereby incorporated by reference.

Further, it may be preferable that if the sharing mode is a payment mode, the validity verification may not only be performed by the network device 1 on the wireless access point corresponding to the sharing request, but also the user identity information of the user equipment 2 can be verified, so that the interests of the provision user, especially the owner of the wireless access point can be better protected. That is, when the sharing mode information indicates a payment sharing mode, in step S622, the network device verifies user identity information of the user equipment 2. Here, by taking the verification of the user identity of the user equipment as an ownership as an example, the user identity information provided by the user equipment and capable of proving itself as the owner of the wireless access point may include nameplate information of a router corresponding to the wireless access point, and may also include web page screenshot information of the router corresponding to the wireless access, etc. Then, in step S63, when a verification result for the user identity information is that the user equipment 2 has an ownership corresponding to the wireless access point, the network device 1 stores and marks wireless access point related information of the wireless access point, and the wireless access point related information correspondingly matches the user equipment 2. Here, after the user identity information verification is passed, the wireless access point related information is stored, and is marked as a wireless access point shared by the user equipment 2 with the ownership. Here, it may be preferable to correspondingly match the stored wireless access point related information with the user equipment 2. For example, the stored wireless access point related information is marked with identification information of the user equipment 2, such as device MAC information. Therefore, when the network device 1 stores multiple versions of wireless access point related information of the same wireless access point, it may also be convenient to distinguish and manage different versions of wireless access point related information of the same wireless access point based on the identification information.

Here, it should understand that the above-mentioned various types of verifications of the user identity information are merely exemplary, and the other existing or other types of verifications of the user identity information that may appear in the future should also be included in the scope of protection of the present application as applicable to the present application and are hereby incorporated by reference.

In this embodiment, the validity verification performed by means of the wireless access point can effectively ensure the success rate of connecting to the corresponding wireless network based on the wireless access point related information. By verifying the user identity information of the user equipment 2, the interests of the provision user, especially the owner of the wireless access point can be better protected.

In a embodiment, the method at the network device 1 further comprises steps S64 (not shown) and S65 (not shown). In step S64, the network device 1 obtains a sharing permission for the wireless access point sent by the user equipment 2 with the ownership; and in step S65, the network device 1 sends the sharing permission to the other matching user equipment without ownership, and the other user equipment without ownership send sharing requests for the wireless access point to corresponding network devices 1 based on the sharing permission.

In one embodiment, it may be preferable herein to reasonably presume that a user corresponding to the user equipment 2 with ownership is an owner of the wireless access point or the one who has the right to share. Here, the user equipment 2 with ownership can set the sharing permission for its corresponding wireless access point, and the sharing permission can include allowing the other user equipment without ownership to share the wireless access point in a free mode, or allowing the other user equipment without ownership to share the wireless access point in a payment mode. Here, the sharing permission can specify other user equipment without ownership, of which a certain or several user equipment can obtain the sharing permission, and can also be a kind of conditions for setting user equipment without ownership that can obtain the sharing permission, and it is only the other user equipment without ownership satisfying the conditions that can obtain the sharing permission. For example, the user equipment 2 with ownership can share the sharing permission to some or all of contacts in its device address book. Then, the network device 1 sends, actively or based on a corresponding request, the sharing permission to the other matching user equipment without ownership. Here, the other user equipment without ownership may send corresponding sharing requests for the wireless access point to the network devices 1 based on the sharing permission.

In a embodiment, the method at the network device 1 further comprises step S66 (not shown). In step S66, when the wireless access point stored in the network device 1 corresponds to multiple versions of wireless access point related information, for example, the network device 1 receives multiple sharing requests for the same wireless access point, the network device 1 determines, from the determined multiple versions of access point related information, valid access point related information corresponding to the wireless access point, for example, determining, according to priority determination rules, that wireless access point related information with the highest priority is valid access point related information corresponding to the wireless access point. Here, the priority determination rules include, but are not limited to: the wireless access point related information provided by the user equipment 2 with ownership having a priority over the wireless access point related information of the same wireless access point provided by the user equipment 2 without ownership. Here, the user equipment 2 without ownership may be any user equipment 2 that does not have an ownership but knows the wireless access point related information at the same time; in addition, it may be preferable that if a sharing permission is set to the user equipment 2 with ownership corresponding to the wireless access point, the user equipment 2 without ownership may also send the sharing request based on the sharing permission. Here, the priority determination rules further comprise: with regard to the case of multiple user equipment 2 with ownership, wireless access point related information corresponding to a temporally subsequent sharing request is prioritized. At this time, it may be preferable that the rule may also be further divided: if access information of a wireless access point corresponding to the temporally subsequent sharing request is different from access information of the same wireless access point corresponding to the previous sharing request, wireless access point related information corresponding to the temporally subsequent sharing request is prioritized; and if the access information of the wireless access point corresponding to the temporally subsequent sharing request is consistent with the access information of the same wireless access point corresponding to the previous sharing request, the user equipment 2 corresponding to the default previous sharing request is prioritized, with the access information remaining unchanged.

Here, a scenario where the priority determination rule is applicable is that when the demand device desires to obtain wireless access point related information of a target wireless access point stored in the network device 1, the demand device can be matched with wireless access point related information with a higher priority version based on the priority determination rule, in order to increase the success rate of the demand device connecting to the wireless access point, because in general, the owner of the wireless access point has the right to change the wireless access point related information, and at the same time, the temporally subsequent information is generally the latest valid information.

In addition, the priority determination rules can further comprise: when the multiple versions of access point related information of the same wireless access point are from user equipment 2 with different operating systems, the access point related information provided by the user equipment 2 with a high operating system priority may be pre-set as the valid access point related information corresponding to the wireless access point. Here, it should understand that the above-mentioned various priority determination rules are merely exemplary, and the other existing or other priority determination rules that may appear in the future should also be included in the scope of protection of the present application as applicable to the present application and are hereby incorporated by reference.

In this embodiment, when the network device 1 stores multiple versions of wireless access point related information of the same wireless access point, the priorities of the multiple versions of wireless access point related information can be determined. For example, the wireless access point related information provided by the user equipment 2 with the ownership has a priority over the wireless access point related information of the same wireless access point provided by the user equipment 2 without ownership. For another example, with regard to the case of multiple user equipment 2 with ownership, wireless access point related information corresponding to the temporally subsequent sharing request is prioritized. Here, by means of the setting of the priority of the wireless access point related information, the wireless access point related information which is most effective and has the highest connection success rate can be determined from multiple wireless access point related information of the same wireless access point shared by the different user equipment 2, thereby optimizing the connection experience of the corresponding demand users to the wireless access point.

Figure 7:
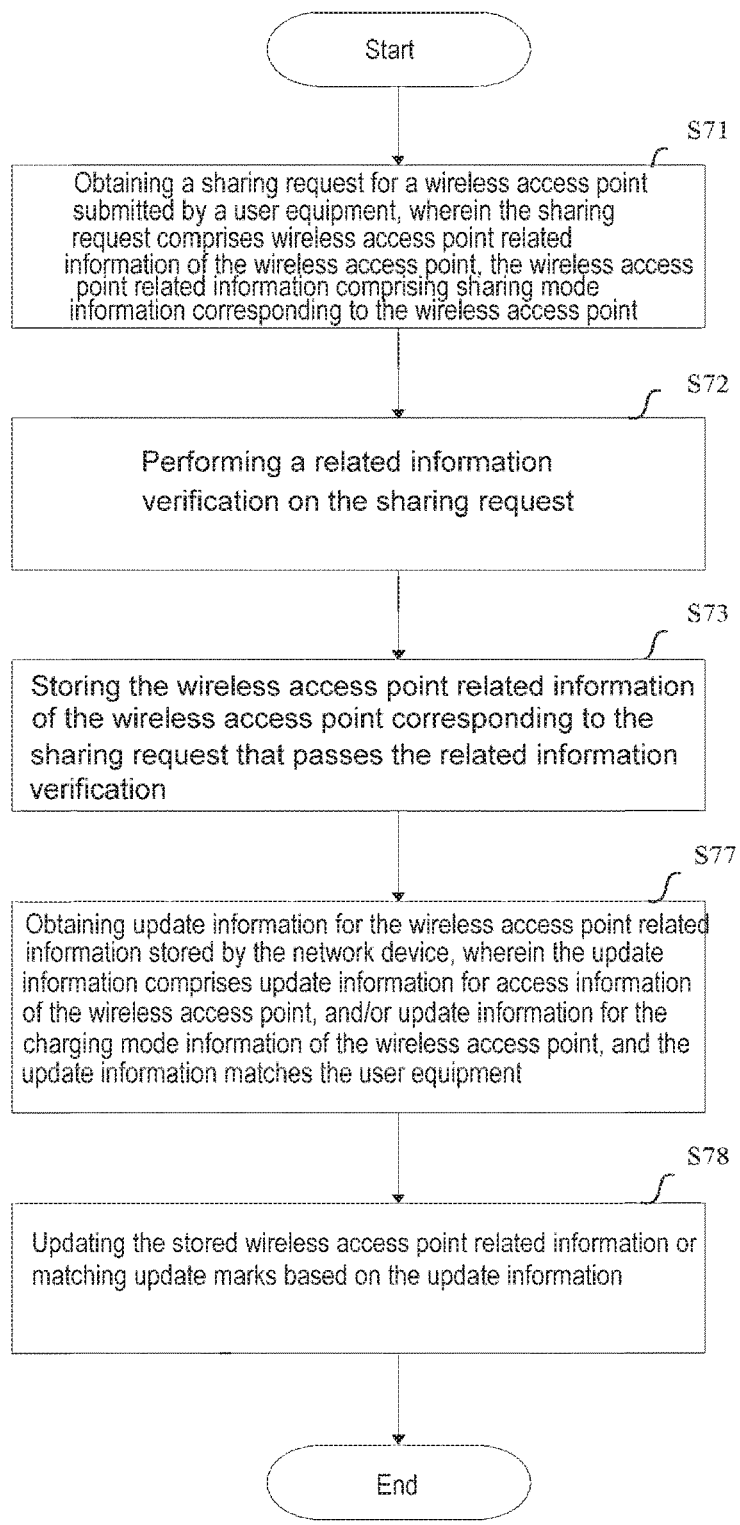
FIG. 7 shows a flowchart of a method for sharing a wireless access point at a network device end according to another embodiment of the present application.

FIG. 7 shows a flowchart of a method for sharing a wireless access point at a network device end according to another embodiment of the present application. The method comprises steps S71, S72, S73, S77 and S78.

In step S71, the network device 1 obtains a sharing request for a wireless access point submitted by user equipment 2, and the sharing request comprises wireless access point related information of the wireless access point, the wireless access point related information comprising sharing mode information corresponding to the wireless access point; in step S72, the network device 1 performs a related information verification on the sharing request; in step S73, the network device 1 stores the wireless access point related information of the wireless access point corresponding to the sharing request that passes the related information verification; in step S77, the network device 1 obtains update information for the wireless access point related information stored in the network device 1, and the update information comprises update information for access information of the wireless access point, and/or update information for the charging mode information of the wireless access point, and the update information matches the user equipment 2; and in step S78, the network device 1 updates the stored wireless access point related information or matches update marks based on the update information. Here, the contents of steps 71, 72 and 73 are correspondingly the same as or substantially the same as those of steps 51, 52 and 53 shown in FIG. 5, which will not be described in detail herein and are hereby incorporated by reference.

In one embodiment, in step S77, the network device 1 obtains update information for the wireless access point related information stored in the network device 1, and the update information comprises update information for the access information of the wireless access point, and/or update information for the charging mode information of the wireless access point, and the update information matches the user equipment 2. Here, the update information may comprise the updated specific data of the access point related information, or may also be merely change prompt information indicating that the wireless access point related information is updated. Here, it may be preferable that the update information may be obtained by the network device 1 from the user equipment 2. In addition, it can also be that the update information is firstly provided by the user equipment 2 to be stored to a third-party temporary database, a data cache means, etc., and then is obtained by the network device 1 from the temporary database and data cache means. Here, the following several application scenarios can be included In one embodiment: it can be that the network device 1 periodically obtains the update information, and the update information comprises the updated specific data of the access point related information, so that the network device 1 performs a data update on the stored wireless access point related information based on the update information; it can also be that the network device 1 obtains the update information in real time, and the update information comprises the updated specific data of the access point related information, so that the network device 1 performs a data update on the stored wireless access point related information based on the update information; it can also be that the network device 1 obtains the update information in real time, and the update information corresponds to the change prompt information indicating that the wireless access point related information is updated, so that the network device 1 only matches the stored wireless access point related information with update marks based on the update information, and in this scenario, when the subsequent demand users request the wireless access point related information, the actually updated specific data is found in the user equipment 2 or the temporary database and the data cache means again based on the heading of the update marks, such that the resource consumption of data transmission and data storage in the network device 1 can be reduced as a whole while ensuring the validity of the wireless access point related information obtained by the demand users. Here, it should understand that the above-mentioned various application scenarios of this embodiment are merely exemplary, and the other existing or other various application scenarios that may appear in the future should also be included in the scope of protection of the present application as applicable to the present application and are hereby incorporated by reference.

Here, the wireless access point related information comprises one or both of the access information and the charging mode information. And preferably, the update information matches the user equipment, such as matching the user equipment identification information. Here, it should understand that the above-mentioned access information and charging mode information are merely exemplary, and the other existing or other various types of wireless access point related information that may appear in the future should also be included in the scope of protection of the present application as applicable to the present application and are hereby incorporated by reference.

In this embodiment, the network device 1 obtains update information for the wireless access point related information, and the update information comprises update information for the access information of the wireless access point, and/or update information for the charging mode information of the wireless access point, and updates the stored wireless access point related information or matches update marks based on the update information for the wireless access point. Here, multiple update manners can be flexibly selected based on the impact and demand of data update on the overall running efficiency, for example, updating specific data, such as access information, or/and charging mode information of the stored wireless access point based on the update information for the wireless access point related information; and for another example, setting an update mark first, and then performing an oriented data update based on the subsequent requirements, such as the request from the demand users, based on an indication of the update mark.

and FIG. 8 shows a flowchart of a method for sharing a wireless access point at a network device end and a user equipment end according to another embodiment of the present application. The method comprises steps S81, S82 and S83.

In one embodiment, in step S81, the user equipment 2 sends a sharing request for a wireless access point to the corresponding network device 1, and the sharing request comprises wireless access point related information of the wireless access point, the wireless access point related information comprising sharing mode information corresponding to the wireless access point; then, in step S82, the network device 1 performs a related information verification on the sharing request; and in step S83, the network device 1 stores the wireless access point related information of the wireless access point corresponding to the sharing request that passes the related information verification. Here, step S81 corresponds to step 51 shown in FIG. 5, and the contents of steps S82 and S83 are the same as or substantially the same as those of steps S52 and S53 shown in FIG. 5, which will not be described in detail herein and are hereby incorporated by reference.

In this embodiment, the user equipment 2 implements the sharing of the wireless access point more efficiently in cooperation with the network device 1 by sending the sharing request and the update information to the network device 1.

Preferably, when the sharing mode information indicates a payment sharing mode, the wireless access point related information further comprises user identity information of the user equipment 2 and charging mode information of the wireless access point.

In one embodiment, the user identity information included in the sharing request submitted by the user equipment 2 herein is to facilitate the user identity verification performed by the network device 1 on the user equipment 2, and particularly when the sharing mode is the payment mode, the user identity verification can better protect the interest of the provision user, especially the owner of the wireless access point. Here, when the user equipment 2 is the owner of the wireless access point, the user identity information may include related information that can prove or presume that the user of the user equipment 2 is the owner of the wireless access point; in addition, if the user equipment 2 is a device without ownership, the user identity information may include related information matching the sharing permission provided by the user equipment with ownership.

Preferably, the method at the user equipment 2 further comprises step S84 (not shown). In step S84, the user equipment 2 sends update information for the wireless access point related information to a corresponding network device 1, and the update information comprises update information for access information of the wireless access point, and/or update information for the charging mode information of the wireless access point, and the update information matches the user equipment 2.

In one embodiment, update information for the wireless access point related information herein is directly sent to the network device 1 by the user equipment 2, and the update information herein may include the updated specific data of the access point related information, or may also be merely change prompt information indicating that the wireless access point related information is updated. Here, according to actual needs, different update modes for update information can be set, such as real-time update and regular update. Further, it may be preferable that it is also possible to flexibly set different update modes of the update information for different types of wireless access point related information.

For it, it is apparent that the present application is not limited to the details of the above-mentioned exemplary embodiments, and the present application can be implemented in other specific forms without departing from the spirit or basic features of the present application. Therefore, no matter from which point of view, the embodiments should all be regarded as exemplary and non-limiting. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the device claims may also be implemented by one unit or means by means of software or hardware. The terms first and second and the like are used to represent names and do not represent any particular order.

What is claimed is:

1. A method for sharing a wireless access point at a network device end, comprising:
    obtaining a sharing request for a wireless access point submitted by a user equipment, wherein the sharing request comprises wireless access point related information of the wireless access point, the wireless access point related information comprising sharing mode information corresponding to the wireless access point;
    performing a related information verification on the sharing request; and
    storing the wireless access point related information of the wireless access point corresponding to the sharing request that passes the related information verification,
    wherein the step of performing the related information verification on the sharing request further comprises:
    when the sharing mode information indicates a payment sharing mode, verifying user identity information of the user equipment; and
    wherein the step of storing the wireless access point related information of the wireless access point corresponding to the sharing request that passes the related information verification comprises:
    when a verification result for the user identity information is that the user equipment has an ownership corresponding to the wireless access point, storing and marking the wireless access point related information of the wireless access point, wherein the wireless access point related information correspondingly matches the user equipment.

2. The method according to claim 1, wherein the step of performing the related information verification on the sharing request comprises:
    performing a validity verification on the wireless access point corresponding to the sharing request.

3. The method according to claim 1, further comprising:
obtaining a sharing permission for the wireless access point sent by the user equipment with ownership; and
sending the sharing permission to other matching user equipment without ownership, wherein the other user equipment without ownership send sharing requests for the wireless access point to corresponding network devices based on the sharing permission.

4. The method according to claim 1, wherein:
when the wireless access point corresponds to multiple versions of wireless access point related information stored by the network device, determining priority determination rules for determining the multiple versions of access point related information, comprising:
the wireless access point related information provided by the user equipment with ownership having a priority over the wireless access point related information of the same wireless access point provided by the user equipment without ownership; and
with regard to a user equipment with multiple ownerships, wireless access point related information corresponding to a temporally subsequent sharing request is prioritized.

5. The method according to claim 1, wherein when the sharing mode information indicates a payment sharing mode, the wireless access point related information comprises charging mode information of the wireless access point.

6. The method according to claim 1, wherein the method further comprising:
obtaining update information for the wireless access point related information stored by the network device, wherein the update information comprises update information for access information of the wireless access point, and/or update information for the charging mode information of the wireless access point, and the update information matches the user equipment; and
updating the stored wireless access point related information or matching update marks based on the update information.

7. A method for sharing a wireless access point at a user equipment end, comprising:
sending a sharing request for a wireless access point to a corresponding network device, wherein the sharing request comprises wireless access point related information of the wireless access point, the wireless access point related information comprising sharing mode information corresponding to the wireless access point, wherein the sharing mode information comprises a payment sharing mode or a free-of-charge sharing mode;
when the sharing mode information indicates a payment sharing mode, the wireless access point related information further comprises charging mode information, and if the user equipment is the owner of the wireless access point, the user equipment sending a sharing permission of the wireless access point to the network device, and if the user equipment is an user equipment without ownership, the user equipment sending the sharing request for the wireless access point to the corresponding network device after receiving a sharing permission from the network device.

8. The method according to claim 7, wherein when the sharing mode information indicates a payment sharing mode, the wireless access point related information further comprises user identity information of the user equipment.

9. The method according to claim 7, further comprising:
sending update information for the wireless access point related information to a corresponding network device, wherein the update information comprises update information for access information of the wireless access point, and/or update information for the charging mode information of the wireless access point, and the update information matches the user equipment.

10. A network device for sharing a wireless access point, comprising:
a processor;
a memory storing instructions thereon, when executed by the processor, cause the processor to:
obtain a sharing request for a wireless access point submitted by a user equipment, wherein the sharing request comprises wireless access point related information of the wireless access point, the wireless access point related information comprising sharing mode information corresponding to the wireless access point;
perform a related information verification on the sharing request; and
store the wireless access point related information of the wireless access point corresponding to the sharing request that passes the related information verification,
wherein the processor configured to perform the related information verification on the sharing request further comprises the processor configured to verify user identity information of the user equipment when the sharing mode information indicates a payment sharing mode; and
wherein the processor configured to store the wireless access point related information of the wireless access point corresponding to the sharing request that passes the related information verification further comprises the processor configured to store and mark the wireless access point related information of the wireless access point when a verification result for the user identity information is that the user equipment has an ownership corresponding to the wireless access point, wherein the wireless access point related information correspondingly matches the user equipment.

* * * * *